(12) United States Patent
Chung et al.

(10) Patent No.: US 9,467,878 B2
(45) Date of Patent: Oct. 11, 2016

(54) WIRELESS ACCESS POINT APPARATUS AND METHOD FOR TESTING THROUGHPUT

(75) Inventors: Jae Ho Chung, Seoul (KR); Sung Sang You, Seoul (KR); Jae Seon Jang, Seoul (KR); Yung Ha Ji, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 128 days.

(21) Appl. No.: 14/111,954

(22) PCT Filed: Oct. 19, 2011

(86) PCT No.: PCT/KR2011/007777
§ 371 (c)(1),
(2), (4) Date: Dec. 24, 2013

(87) PCT Pub. No.: WO2012/141397
PCT Pub. Date: Oct. 18, 2012

(65) Prior Publication Data
US 2014/0119222 A1    May 1, 2014

(30) Foreign Application Priority Data
Apr. 15, 2011  (KR) .......................... 10-2011-0035374

(51) Int. Cl.
*H04W 24/06* (2009.01)
*H04B 17/00* (2015.01)
*H04W 52/26* (2009.01)
*H04W 52/32* (2009.01)

(52) U.S. Cl.
CPC ............. *H04W 24/06* (2013.01); *H04B 17/00* (2013.01); *H04B 17/0085* (2013.01); *H04W 52/262* (2013.01); *H04W 52/325* (2013.01)

(58) Field of Classification Search
CPC . H04B 17/00; H04B 17/0085; H04W 24/06; H04W 52/262; H04W 52/325
See application file for complete search history.

(56) References Cited

U.S. PATENT DOCUMENTS

| 6,970,430 B2 | 11/2005 | Guven et al. |
| 2009/0207796 A1* | 8/2009 | Chakraborty ......... H04L 1/0006 370/329 |
| 2012/0071192 A1* | 3/2012 | Li ....................... H04W 74/085 455/522 |

OTHER PUBLICATIONS

Xiaomin Ma et al., "Capture Effect on R-ALOHA Protocol for Inter-Vehicle Communications", Institute of Electrical and Electronics Engineers, 2005, pp. 2547-2550.

* cited by examiner

*Primary Examiner* — Jae Y Lee
(74) *Attorney, Agent, or Firm* — Sughrue Mion, PLLC

(57) ABSTRACT

A method and an apparatus for testing a throughout of a wireless access point apparatus are provided. The apparatus includes a receiver which is configured to receive a test start request signal and a test packet transmission condition change request signal, a test signal generator which is configured to generate a test packet signal; a transmission condition adjuster configured to adjust the transmission condition of the test packet signal; a transmitter configured to transmit the test packet signal to the neighboring access point apparatus under the transmission condition, which is adjusted by the transmission condition adjuster; and a test executor configured to execute a test having a predetermined sequence so as to execute a throughput test for the neighboring access point apparatus with regards to receiving the test packet signal.

8 Claims, 3 Drawing Sheets

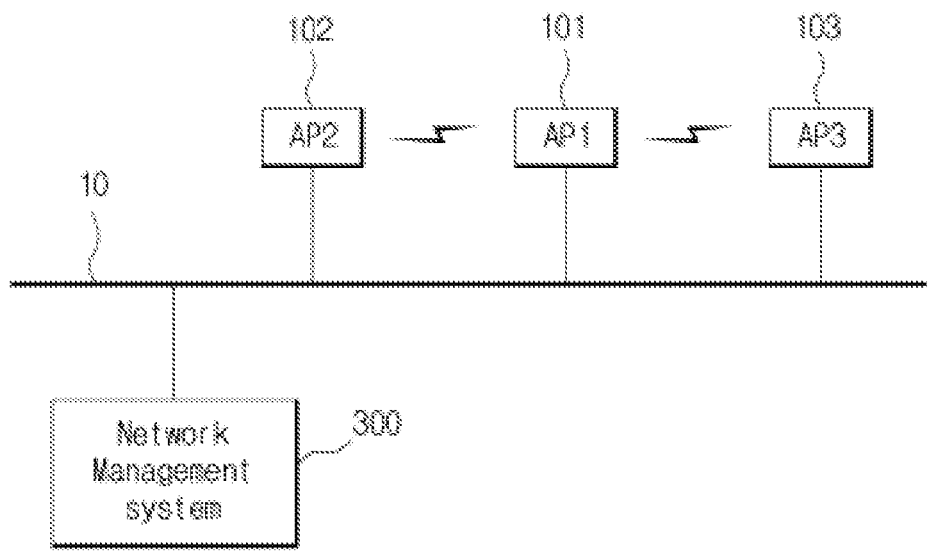
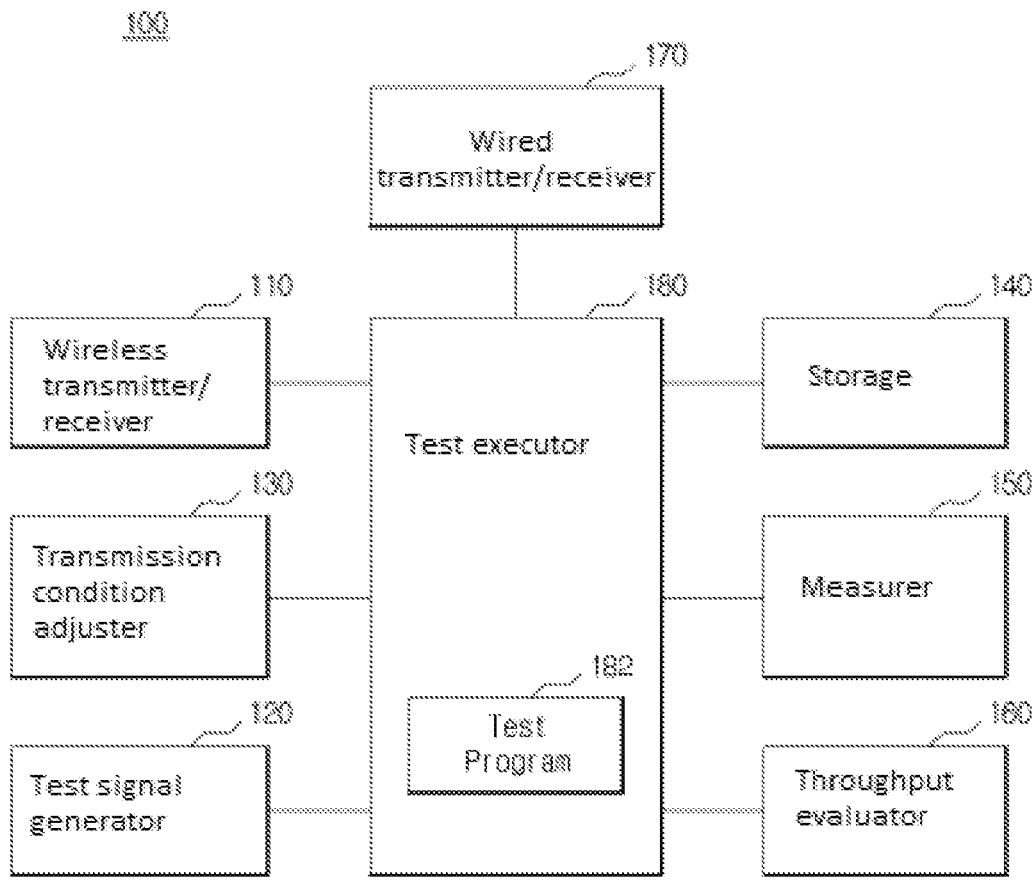

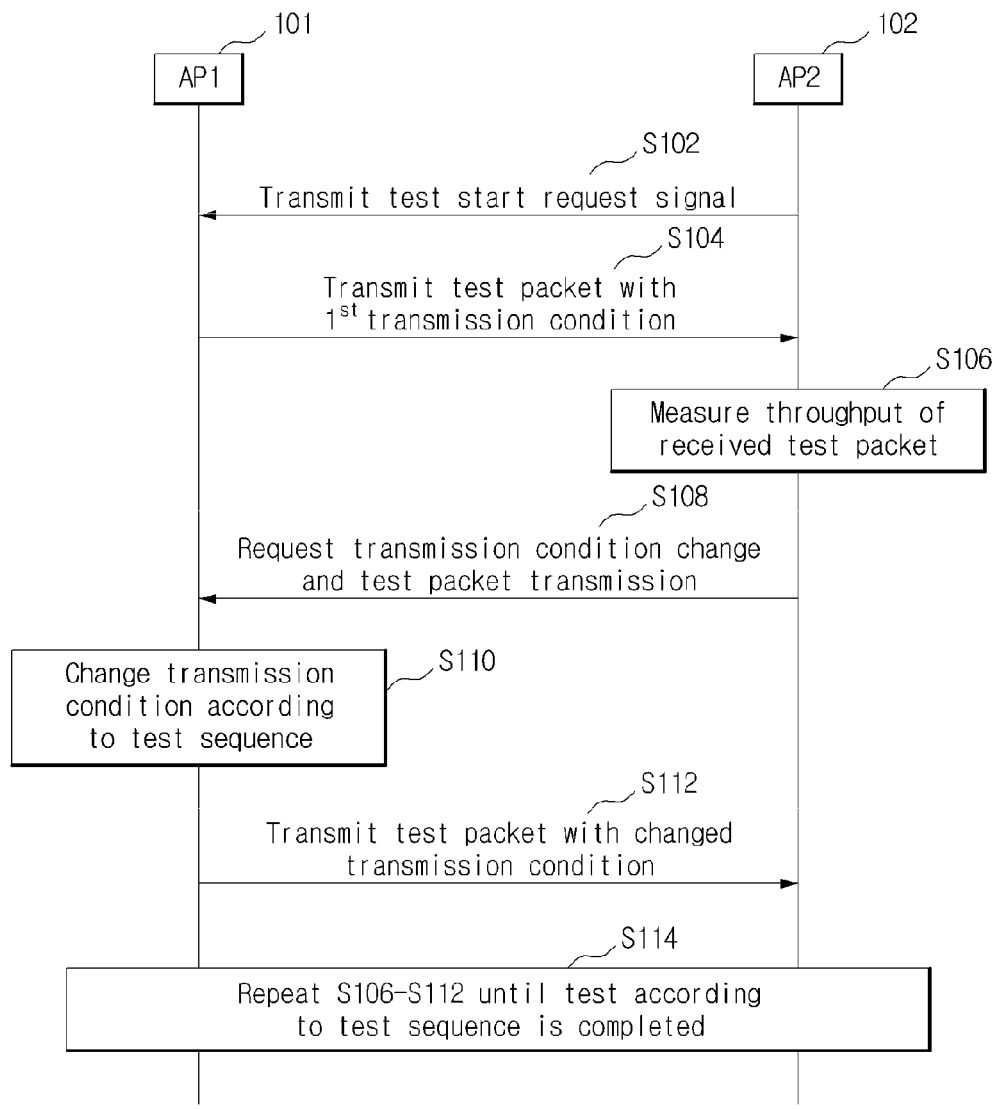

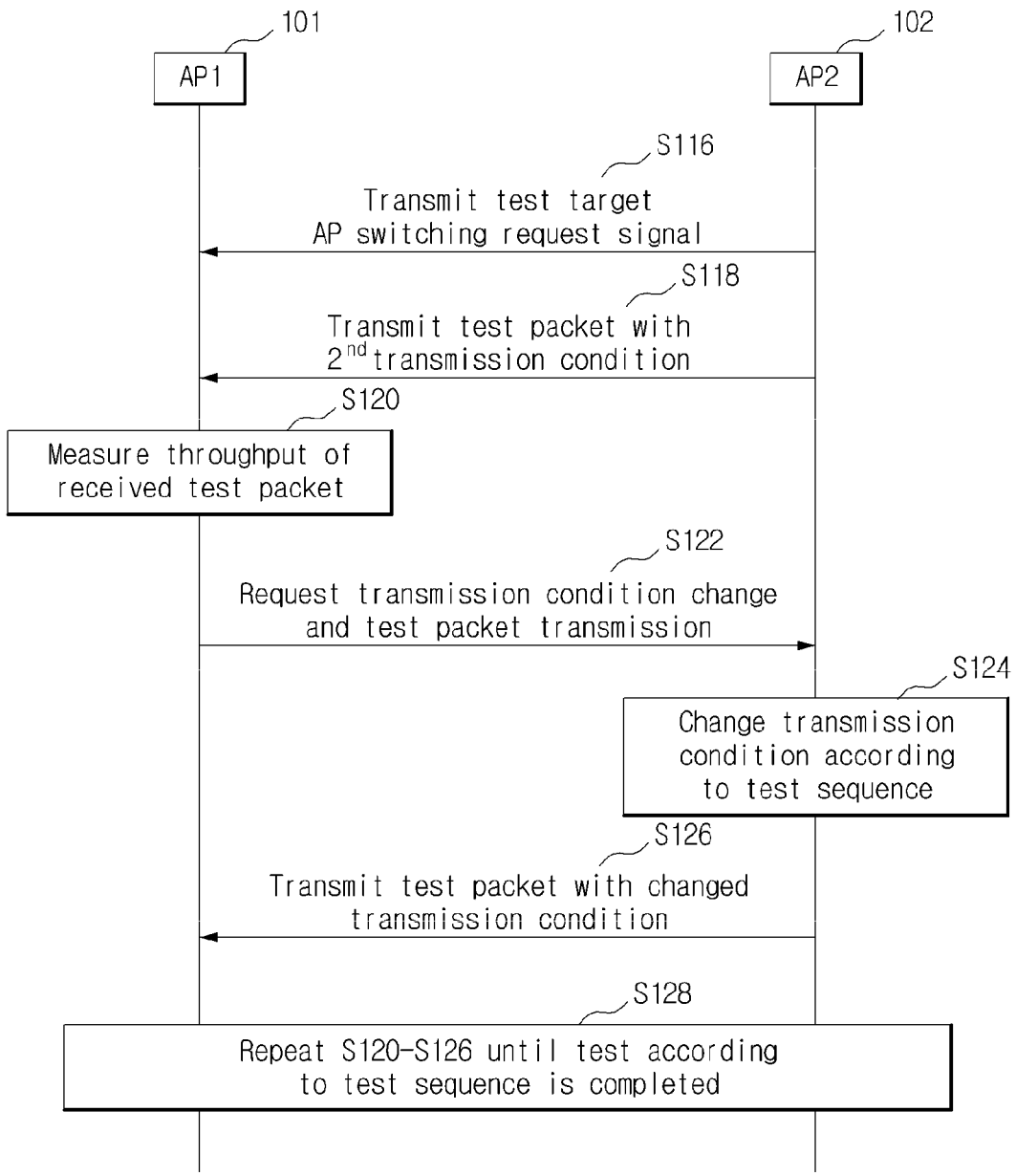

WIRELESS ACCESS POINT APPARATUS AND METHOD FOR TESTING THROUGHPUT

CROSS-REFERENCE TO RELATED APPLICATION

This application is a national stage entry of the PCT application no. PCT/KR2011/007777 filed on Oct. 19, 2011, which claims the benefit of priority from Korean Patent Application No. 10-2011-0035374, filed on Apr. 15, 2011 in the Korean Intellectual Property Office, the disclosures of which are incorporated herein by reference in their entirety.

BACKGROUND

1. Field

Exemplary embodiments relate to a wireless access point apparatus, and more specifically, to an apparatus and a method for testing the performance of a wireless access point apparatus through cooperation among neighboring access points.

2. Description of the Related Art

Recently, wireless network environments have been increasingly popular due to the advancement of wireless communication technologies. For example, the Wireless Local Area Network (WLAN) technology such as Institute of Electrical and Electronics Engineers (IEEE) 802.11 has been propagated to replace the conventional wired LAN. The IEEE 802.11 WLAN features the same level of networking as the wired LAN by the use of Radio Frequency (RF) technology in the 2.4 GHz band, called the Industrial Scientific Medical (ISM) band, without using a cable. The IEEE 802.11 WLAN is available in two transmission modes of Infrastructure Networking and Ad-Hoc Networking.

The Ad-Hoc Networking mode creates a network with devices having WLAN that are not connected with an outside network. Since the Ad-Hoc Networking mode allows communication among WLAN devices only, the Ad-Hoc Networking mode is mainly used for configuring a small office or a small network. The Infrastructure Networking mode is available in an environment that is the same as the wired LAN within an office, and configures the WLAN by connecting an access point, which is a wired/wireless access relay device, to a wired network (e.g., Ethernet, etc.). The access point bridges a WLAN device to a wired LAN device to enable data communication with one another. Moreover, in case communication is made with another WLAN device, wireless communication is possible through an access point, called "infrastructure mode."

A very large number of access points (AP) have been recently installed at various locations, owing to the universal expansion of Wi-Fi environments. However, in order to test the reception performance of a wireless AP apparatus, such as a Wi-Fi AP, the tester has to carry particular testing equipment to the location where the pertinent AP is installed and physically connect the testing equipment to the AP. Accordingly, it takes a significant amount of time and cost to check the AP. Moreover, the operation of the AP has to be stopped while the pertinent AP is tested.

SUMMARY

Exemplary embodiments provide a wireless access point apparatus and a method for testing the access point that allows neighboring access points to the test throughput of the access points based on a predetermined sequence through the switching of transmission/reception modes between each other.

According to an aspect of an exemplary embodiment, a method for testing a throughput of a wireless access point apparatus is provided. The method includes: (a) transmitting a predetermined test packet from a first access point to a second access point apparatus; (b) measuring by the second access point a throughput pursuant to receiving the test packet transmitted by the first access point apparatus; (c) transmitting a request for changing a transmission condition of the test packet from the second access point apparatus to the first access point apparatus, wherein the transmission condition includes at least one of a transmission power level of the test packet and an MCS level to be applied to the test packet; (d) transmitting the test packet with the changed transmission condition from the first access point apparatus to the second access point apparatus; and (e) repeating steps (b) to (d) until a test according to a predetermined sequence is completed.

The method can also include, after operations (a) to (e) are completed: (f) transmitting a test target AP switching request signal from the second access point apparatus to the first access point apparatus; (g) transmitting a predetermined test packet from the second access point apparatus to the first access point apparatus after transmitting the test target AP switching request signal; (h) measuring, by the first access point apparatus, a throughput pursuant to receiving the test packet transmitted by the second access point apparatus; (i) transmitting a request for changing the transmission condition of the test packet from the first access point apparatus to the second access point apparatus; (j) transmitting another test packet from the second access point apparatus to the first access point apparatus with a changed transmission condition; and (k) repeating operations (h) to (j) until a test according to a predetermined sequence is completed.

The method may also include: determining, by the second access point apparatus, whether the measured throughput pursuant to the receiving of the test packet is smaller than a throughput predicted by a throughput table. The throughput table is pre-stored in the second access point apparatus and is pre-defined with information on link budget at the time of data communication with the first access point apparatus and throughput values predicted for the link budget and the MCS level.

The method may also include determining, by the first access point apparatus whether the measured throughput of the test packet received from the second access point apparatus is smaller than a throughput predicted by a throughput table. The throughput table is pre-stored in the first access point apparatus and is pre-defined with information on link budget at the time of data communication with the second access point apparatus and throughput values predicted for the link budget and the MCS level.

Another aspect of an exemplary embodiment provides a wireless access point apparatus. The apparatus includes: a receiver which is configured to receive a test start request signal and a test packet transmission condition change request signal from a neighboring access point apparatus. The transmission condition may include at least one of a transmission power level of the test packet and an MCS level to be applied to the test packet. The apparatus further includes a test signal generator which is configured to generate a test packet signal to be transmitted to the neighboring access point apparatus; a transmission condition adjuster which is configured to adjust a transmission condition of the test packet signal; a transmitter which is configured to transmit the test packet signal to the neighboring access point apparatus with the transmission condition adjusted by the transmission condition adjuster; and a test executor which is configured to execute a test program having a predetermined sequence for testing a throughput of the neighboring access point apparatus based on the receiving of the test packet signal. The test executor may be configured to control the test signal generator, the transmission condition adjuster, and the transmitter to allow a predetermined test packet to be transmitted to the neighboring access point apparatus if the test start request signal is received; and changing a transmission condition of the test packet based on the test program and allowing the test packet to be transmitted to the neighboring access point apparatus according to the changed transmission condition whenever the transmission condition change request signal is received.

The wireless access point apparatus may also include a measurer which is configured to measure a throughput of the test packet if the receiver receives the test packet from the neighboring access point apparatus; and an MCS level recorder which is configured to record an MCS level applied to the test packet.

The wireless access point apparatus may also include: a storage which is configured to store a throughput table in which information on a link budget at the time of data communication with the neighboring access point apparatus and throughput values predicted for the link budget and the MCS (Modulation and Coding Scheme) level are pre-defined; and a throughput evaluator which is configured to determine whether a measured throughput value of the test packet received from the neighboring access point apparatus is smaller than a throughput predicted by the throughput table.

According to an exemplary embodiment, neighboring access point apparatuses can automatically test the throughput at the time of the reception AP receiving a signal, according to a predetermined sequence through switching their transmission/reception modes with each other.

Accordingly, service providers can test the reception performance of wireless access point apparatuses without using a wired connection method through the use of additional test equipment, saving the costs and efforts for inspecting and maintaining the wireless access point apparatuses.

BRIEF DESCRIPTION OF THE DRAWINGS

FIG. 1 shows a general condition to which a method for testing throughput in accordance with an exemplary embodiment is applied.

FIG. 2 is a block diagram showing an access point apparatus with which the method for testing signal reception sensitivity is performed in accordance with an exemplary embodiment.

FIG. 3 and FIG. 4 show how the method for testing throughput is performed in accordance with an exemplary embodiment.

DETAILED DESCRIPTION OF EXEMPLARY EMBODIMENTS

Since there can be a variety of permutations and exemplary embodiments, certain exemplary embodiments will be illustrated and described with reference to the accompanying drawings. This, however, does not restrict the inventive concept to certain exemplary embodiments, and shall be construed as including all permutations, equivalents and substitutes covered by the ideas and scope of the exemplary embodiments.

Throughout the description of the exemplary embodiments, when describing a certain relevant technology, details not pertinent to the exemplary embodiments may be omitted. Terms such as "first" and "second" can be used in describing various elements, but the above elements shall not be restricted to the above terms. The above terms are used only to distinguish one element from each other unless otherwise disclosed.

When one element is described as being "connected" or "accessed" to another element, it shall be construed as being connected or accessed to the other element directly but also as possibly having another element in between, unless otherwise described.

Hereinafter, exemplary embodiments will be described in detail with reference to the accompanying drawings.

FIG. 1 shows a general condition to which a method for testing throughput in accordance with an exemplary embodiment is applied.

In FIG. 1, three access point apparatuses (AP1 101, AP2 102 and AP3 103) are presented as a simple example for describing the method for testing signal reception sensitivity of a wireless access point apparatus in accordance with an exemplary embodiment.

Here, AP1 101, AP2 102, and AP3 103 can be accessed using a wired network 10 for communication by being physically connected to the wired LAN 10 or by way of another wired LAN device (not shown) in between. In the latter case, the wired LAN device is physically connected with the wired network 10, and the wired LAN device and each of the access point apparatuses 101-103 can be connected with each other through a wireless LAN. Here, each of the access point apparatuses 101-103 can be a Wi-Fi AP. Moreover, each of the access point apparatuses 101-103 may communicate with a network management system 300 by being connected with the wired network 10, as described above by way of an example.

In a method for testing the reception performance of each wireless access point apparatus in accordance with an exemplary embodiment, each access point apparatus tests the reception performance of the access point apparatuses through cooperation with neighboring access point apparatuses within its own wireless communication coverage. This is briefly described hereinafter in an exemplary embodiment.

For the convenience of description, it will be assumed that the neighboring AP apparatuses within the wireless communication coverage of AP1 101 are AP2 102 and AP3 103, and the neighboring AP apparatus within the wireless communication coverage of AP2 102 is AP1 101, and the neighboring AP apparatus within the wireless communication coverage of AP3 103 is AP1 101.

Accordingly, in the above case, AP1 101 and its neighboring AP apparatus AP2 102 cooperate with each other, and AP1 101 functions as a transmission AP and transmits a predetermined test packet signal to AP2 102, which functions as a reception AP, so that the reception AP2 102 can test and evaluate its own reception performance based on the received test packet signal. Then, the functions of transmission AP and reception AP are reversed, allowing AP2 102 to function as the transmission AP and AP1 101 to function as the reception AP, and AP2 102 transmits the test packet signal to AP1 101 so that the reception AP1 101 can test and evaluate its own reception performance based on the received test packet signal.

The above exemplary method of testing the reception performance through switching the transmission and reception modes between two neighboring AP apparatuses can also be performed for any other two neighboring AP apparatuses (e.g., AP1 101 and AP3 103) shown in FIG. 1.

As such, in order to perform the method of testing the reception performance through switching the transmission and reception modes between any two neighboring AP apparatuses, each AP apparatus can be configured as shown in FIG. 2 in accordance with an exemplary embodiment.

FIG. 2 is a block diagram showing an access point apparatus with which the test method in accordance with an exemplary embodiment is performed. Here, since the block diagram of FIG. 2 can be applied to every AP apparatus 101-103 shown in FIG. 1, the AP apparatuses will be collectively assigned with reference numeral 100 in FIG. 2.

Referring to FIG. 2, a wireless access point apparatus 100 in accordance with an exemplary embodiment can include a wireless transmitter/receiver 110, a wired transmitter/receiver 170, a test signal generator 120, a transmission condition adjuster 130, a storage 140, a measurer 150, a throughput evaluator 160 and a test executor 180. Here, the wired transmitter/receiver 170 can be omitted if the access point apparatus 100 is connected with the wired network 10 by way of another wired LAN device (not shown).

Here, it shall be appreciated that the block diagram of FIG. 2 merely shows the element that are related to executing the method of testing throughput in accordance with an exemplary embodiment and is not intended to exclude other essential elements required for performing functions of the conventional access point apparatus.

Hereinafter, each element will be briefly described with respect its function. Specific functions of each element contributing to performing the method of testing throughput in accordance with an exemplary embodiment will be described in more detail later with reference to FIG. 3 and FIG. 4.

The wireless transmitter/receiver 110 performs communication with other wireless devices that are present within the wireless communication coverage of the wireless access point apparatus. Particularly, in an exemplary embodiment, the wireless transmitter/receiver 110 handles transmission and reception of a wireless signal for testing the reception performance through cooperation with a neighboring AP.

Specifically, in case the access point apparatus 100 functions as a transmission AP when the testing method in accordance with an exemplary embodiment is performed, the wireless transmitter/receiver 110 receives a test start request signal, a transmission condition change request signal, and a test packet retransmission signal. Moreover, in this case, the wireless transmitter/receiver 110 performs a function of transmitting the test packet signal to the neighboring AP with the transmission condition adjusted by the transmission condition adjuster 130.

In case the access point apparatus 100 functions as a reception AP when the testing method in accordance with an exemplary embodiment is performed, the wireless transmitter/receiver 110 performs a function of transmitting the test start request signal to a neighboring AP and a function of receiving a test packet signal from the neighboring AP.

The test signal generator 120 performs a function of generating a predetermined test packet signal to be transmitted to a neighboring AP, in case the access point apparatus 100 functions as a transmission AP.

The transmission condition adjuster 130 performs a function of adjusting a transmission condition of the test packet signal according to a transmission condition change request and a test packet retransmission request received from a neighboring AP, in case the access point apparatus 100 functions as a transmission AP.

In an exemplary embodiment, the transmission condition is at least one of a transmission power level of the test packet and an MCS (Modulation and Coding Scheme) to be applied to the test packet.

The test executor 180 executes a test program 182 having a predetermined sequence for testing the signal reception sensitivity of a neighboring AP. For this, the test executor 180 can control the test signal generator 120, the transmission condition adjuster 130 and the wireless transmitter/receiver 110.

That is, the test executor 180 allows a predetermined test packet to be transmitted to a neighboring AP with a predetermined first transmission condition, after the test start request signal is received. Moreover, whenever the transmission condition change request signal and the test packet retransmission request signal are received from the neighboring AP, the test executor 180 can change the transmission condition of the test packet (i.e., the MCS level to be applied to the test packet and/or the transmission power level of the test packet) based on the test program and allow the test packet to be transmitted to the neighboring AP with the changed transmission condition.

The measurer 150 measures throughput at the time of receiving the test packet from the neighboring AP, in case the access point apparatus 100 functions as a reception AP. In an exemplary embodiment, the throughput refers to a reception rate when the test packet transmitted from the transmission AP is received by the reception AP and is expressed in units of bps. The method of measuring the throughput can be based on a known method and thus will not be described herein.

The throughput evaluator 160 can evaluate a throughput performance of a reception AP by comparing a throughput value measured for the test packet received from the neighboring AP (i.e., the test packing having a particular MCS level and a particular transmission power) with a throughput table stored in the storage 140, in case the access point apparatus 100 functions as a reception AP.

Here, the throughput table includes prediction throughput values at the reception AP that are predicted according to a link budge and MCS level when a downlink transmission is made from the transmission AP to the reception AP.

Here, the link budget is determined based on the distance between the transmission AP and the reception AP, a transmission environment (i.e., signal reduction, gain, etc. in the transmission environment), the transmission power level of data transmitted from the transmission AP, etc. Therefore, if each AP is pre-stored with information on the distance between two neighboring APs and the transmission environment, the link budget can be changed based on a downlink transmission power level of the test packet at the transmission AP.

Accordingly, if the throughput table, in which link budget values determined according to the change of the downlink transmission power level on the side of the transmission AP and throughput values predicted when the MCS level applied to the test packet is considered are defined, is stored in the reception AP, the reception AP can evaluate the throughput performance of the reception AP by comparing the measured actual throughput value with the link budget value and the throughput value required (predicted) at the MCS level in the throughput table. For example, if the measured throughput value is smaller than the predicted throughput value, it can be confirmed that the throughput performance is outside a normal operation range.

Here, as a result of evaluating the measured throughput value or the throughput performance, the reception AP can have the applied MCS level, etc. stored in the storage 140. The result of evaluating the throughput performance can be reported to the network administration system 300 shown in FIG. 1.

Hereinafter, the method of testing throughput of a wireless access point apparatus in accordance with an exemplary embodiment will be described in more detail with reference to FIG. 3 and FIG. 4. Through the description of FIG. 3 and FIG. 4, the roles and function of the elements illustrated in the block diagram of FIG. 2 will be understood more clearly.

For the convenience of description and understanding, the method of testing throughput will be described using two AP apparatuses of AP1 101 and AP2 102 only.

In describing the testing method in accordance with an exemplary embodiment, FIG. 3 is a flow diagram showing when AP1 101 functions as a transmission AP1 and AP2 102 functions as a reception AP.

In operation S102, the reception AP2 102 transmits a test start request signal to the neighboring AP1 101. The test start request signal can be transmitted to AP1 101 at a predetermined time period according to a test program of AP2 102. For example, the test program can be programmed to start testing automatically during dawn hours, when a wireless LAN is at a low usage.

Although it is assumed in an exemplary embodiment that the reception AP transmits the test start request signal to the transmission AP to start the test, it is also possible that the transmission AP transmits the test start request signal to the reception AP to start the test. However, the following description will be made under the assumption of the former case.

In operation S104, once AP1 101 receives the test start request signal transmitted by the neighboring AP2 102, the transmission AP1 101 transmits a test packet predetermined according to the test program to the reception AP2 102 with a predetermined first transmission condition.

Here, the test packet refers to a data packet that is predetermined between neighboring AP apparatuses in order to execute a test in accordance with an exemplary embodiment. Moreover, the first transmission condition is an initial definition of the transmission power level of the test packet to be transmitted to the reception AP upon the start of the test and the MCS level to be applied to the test packet. The first transmission condition can be predetermined according to the test program.

Accordingly, the test packet to be transmitted is transmitted to the reception AP with a particular downlink transmission power level after being modulated and encoded to a specific MCS level that is determined according to the test program.

In operation S106, once the test packet is received from the transmission AP1 101, the reception AP2 102 measures the throughput of the received test packet. Here, AP2 102 can record the MCS level applied to the received test packet.

In operation S108, once the measuring and recording are completed, the reception AP2 102 requests the transmission AP1 101 for changing the transmission condition and retransmitting the test packet.

Accordingly, in operation S110, the transmission AP1 101 changes the transmission condition, with which the test packet is to be transmitted, according to the definition in the test program, and in operation S112, the transmission AP1 101 retransmits the test packet to the reception AP2 102 with the changed transmission condition. In this case, the reception AP2 102 repeats operation S106 of measuring the throughput for the test packet transmitted with the changed transmission condition.

The requesting for changing the transmission condition (operation S108), the change of the transmission condition and retransmission of test packet with the changed transmission condition (operations S110 and S112) and the measuring of the throughput (operation S106) can be repeated until a test sequence defined in the test program is completed (refer to operation S114).

In other words, in an exemplary embodiment, for testing the throughput of the reception AP, the same test packet is repeatedly transmitted from the transmission AP to the reception AP by changing the transmission condition step by step according to the test sequence predefined by the test program, and the throughput of the test packet transmitted repeatedly is measured.

Moreover, in an exemplary embodiment, the reception AP can evaluate the throughput performance of the reception AP, based on the throughput values measured through the above operations. Here, the method described with reference to FIG. 2 can be used as the method for evaluating the throughput performance.

That is, the throughput evaluator 160 of the reception AP can evaluate the throughput performance of the reception AP by comparing the measured throughput values with a pre-stored throughput table.

Hitherto, in the case of testing throughput of AP2 102 when AP1 101 functions as a transmission AP1 101 and AP2 102 functions as a reception AP has been described with reference to FIG. 3. Hereinafter, described with reference to FIG. 4 will be the case of testing the throughput of AP1 101 by switching the transmission AP and the reception AP with each other after the test according to FIG. 3 is completed. However, as described above, any description that is redundant with FIG. 3 will be omitted because FIG. 4 has the same or similar operations as FIG. 3, except for switching of the transmission AP and the reception AP with each other.

Once the testing of the throughput of AP2 102 is completed according to the flow diagram shown in FIG. 3, AP2 102, which was previously the reception AP, transmits a test target AP switching request signal to AP1 101, in operation S116. Accordingly, AP2 102 starts to function as the transmission AP, and AP1 101 starts to function as the reception AP.

In operation S118, after receiving the test target AP switching request signal, AP2 102 transmits a test packet to the reception AP1 101 with a predetermined second transmission condition. Here, the test packet can be the same as the test packet described with reference to FIG. 3 or a predetermined new data packet. The second transmission condition is defined according to the test program and is the same or similar to the description provided with reference to FIG. 3, and thus the description thereof will be omitted.

In operation S120, once the test packet is received from AP2 102, AP1 101 measures the throughput of the test packet.

In operation S122, once the above operation is completed, the reception AP1 101 requests the transmission AP2 102 for changing the transmission condition and retransmitting the test packet. Accordingly, the transmission AP2 102 changes the transmission condition according to a test sequence programmed in the test program and retransmits the test packet to the reception AP1 101 (operations S124 and S126). As described earlier, these operations can be repeated until the test sequence predetermined by the test program is completed (refer to operation S128).

According to the above exemplary operations, the reception AP1 101 can test and evaluate the throughput. As the method of evaluating the throughput can be analogous to the one described above with reference to FIG. 3.

As such, according to an exemplary embodiment, the reception performance of wireless access point apparatus can be tested and evaluated by use of a test sequence (test scenario) according to a predetermined test program, without the use of particular test equipment, by switching the transmission and reception modes for testing the throughput between the neighboring AP apparatuses.

While not restricted thereto, an exemplary embodiment can be embodied as computer-readable code on a computer-readable recording medium. The computer-readable recording medium is any data storage device that can store data that can be thereafter read by a computer system or executed by a processor. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

Although an exemplary embodiment have been described, it shall be appreciated that a variety of permutations and modifications to exemplary embodiments are possible by those who are ordinarily skilled in the art without departing from the technical ideas and scopes of the exemplary embodiments which shall be defined by the claims appended below.

What is claimed is:

1. A method for testing a throughput of a wireless access point apparatus, comprising:
   (a) transmitting a predetermined test packet from a first access point apparatus to a second access point apparatus;
   (b) measuring, by the second access point apparatus, a throughput pursuant to receiving the test packet transmitted by the first access point apparatus;
   (c) transmitting from the second access point apparatus, a request for transmitting another test packet that is generated according to a changed transmission condition, to the first access point apparatus, wherein the transmission condition comprises at least one of a transmission power level of the test packet and a Modulation and Coding Scheme (MCS) level to be applied to the test packet;
   (d) transmitting from the first access point apparatus the another test packet according to the changed transmission condition to the second access point apparatus; and
   (e) repeating operations (b) to (d) until a test according to a predetermined sequence is completed.

2. The method of claim 1, wherein after the operations (a) to (e), the method further comprises:
   (f) transmitting a test target AP switching request signal from the second access point apparatus to the first access point apparatus;
   (g) transmitting a predetermined test packet from the second access point apparatus to the first access point apparatus after transmitting the test target AP switching request signal;
   (h) measuring, by the first access point apparatus, a throughput pursuant to receiving the test packet transmitted by the second access point apparatus;
   (i) transmitting a request for transmitting a third test packet that is generated according to another changed transmission condition of the test packet from the first access point apparatus to the second access point apparatus;
   (j) transmitting another test packet from the second access point apparatus to the first access point apparatus according to the another changed transmission condition; and
   (k) repeating the operations (h) to (j) until a test according to a predetermined sequence is completed.

3. The method of claim 1, further comprising:
determining, by the second access point apparatus, whether the measured throughput pursuant to the receiving of the test packet is smaller than a throughput predicted by a throughput table,
wherein the throughput table is pre-stored in the second access point apparatus and is pre-defined with information on link budget at the time of data communication with the first access point apparatus and throughput values predicted for the link budget and the MCS level.

4. The method of claim 2, further comprising:
determining, by the first access point apparatus, whether the measured throughput of the test packet received from the second access point apparatus is smaller than a throughput predicted by a throughput table, wherein the throughput table is pre-stored in the first access point apparatus and is pre-defined with information on link budget at the time of data communication with the second access point apparatus and throughput values predicted for the link budget and the MCS level.

5. A wireless access point apparatus, comprising:
a receiver which is configured to receive a test start request and a test packet transmission condition change request from a neighboring access point apparatus, wherein a transmission condition comprises at least one of a transmission power level of a test packet and a Modulation and Coding Scheme (MCS) level to be applied to the test packet, the test packet transmission condition change request being used for transmitting the test packet;
a test signal generator which is configured to generate the test packet to be transmitted to the neighboring access point apparatus;
a transmission condition adjuster which is configured to adjust the transmission condition to be used for transmitting the test packet in response to the test packet transmission condition change request;
a transmitter which is configured to transmit the test packet to the neighboring access point apparatus according to the transmission condition adjusted by the transmission condition adjuster; and
a test executor which is configured to execute a test program having a predetermined sequence for testing a throughput of the neighboring access point apparatus using the receiving of the test packet,
wherein the test executor is further configured to control the test signal generator, the transmission condition adjuster and the transmitter to allow a predetermined test packet to be transmitted to the neighboring access point apparatus if the test start request is received; and further configured to change the transmission condition to be used for transmitting the test packet based on the test program and allowing the test packet to be transmitted to the neighboring access point apparatus according to the changed transmission condition whenever the test packet transmission condition change request is received.

6. The wireless access point apparatus of claim 5, further comprising:
- a measurer which is configured to measure a throughput of the test packet if the receiver receives the test packet from the neighboring access point apparatus; and
- an MCS level recorder which is configured to record the MCS level applied to the test packet.

7. The wireless access point apparatus of claim 6, further comprising:
- a storage which is configured to store a throughput table in which information on link budget at the time of data communication with the neighboring access point apparatus and throughput values predicted for the link budget and the MCS level are pre-defined; and
- a throughput evaluator which is configured to determine whether a measured throughput value of the test packet received from the neighboring access point apparatus is smaller than a throughput predicted by the throughput table.

8. The method of claim 1, further comprising changing the transmission condition at the first access point apparatus in response to the request for changing the transmission condition.

* * * * *